March 11, 1969

G. A. SAWAN 3,432,211

SAFETY AUTOMATIC BRAKE

Filed Jan. 26, 1968

INVENTOR.
GEORGE A. SAWAN
BY
Misegades & Douglas
ATTORNEYS

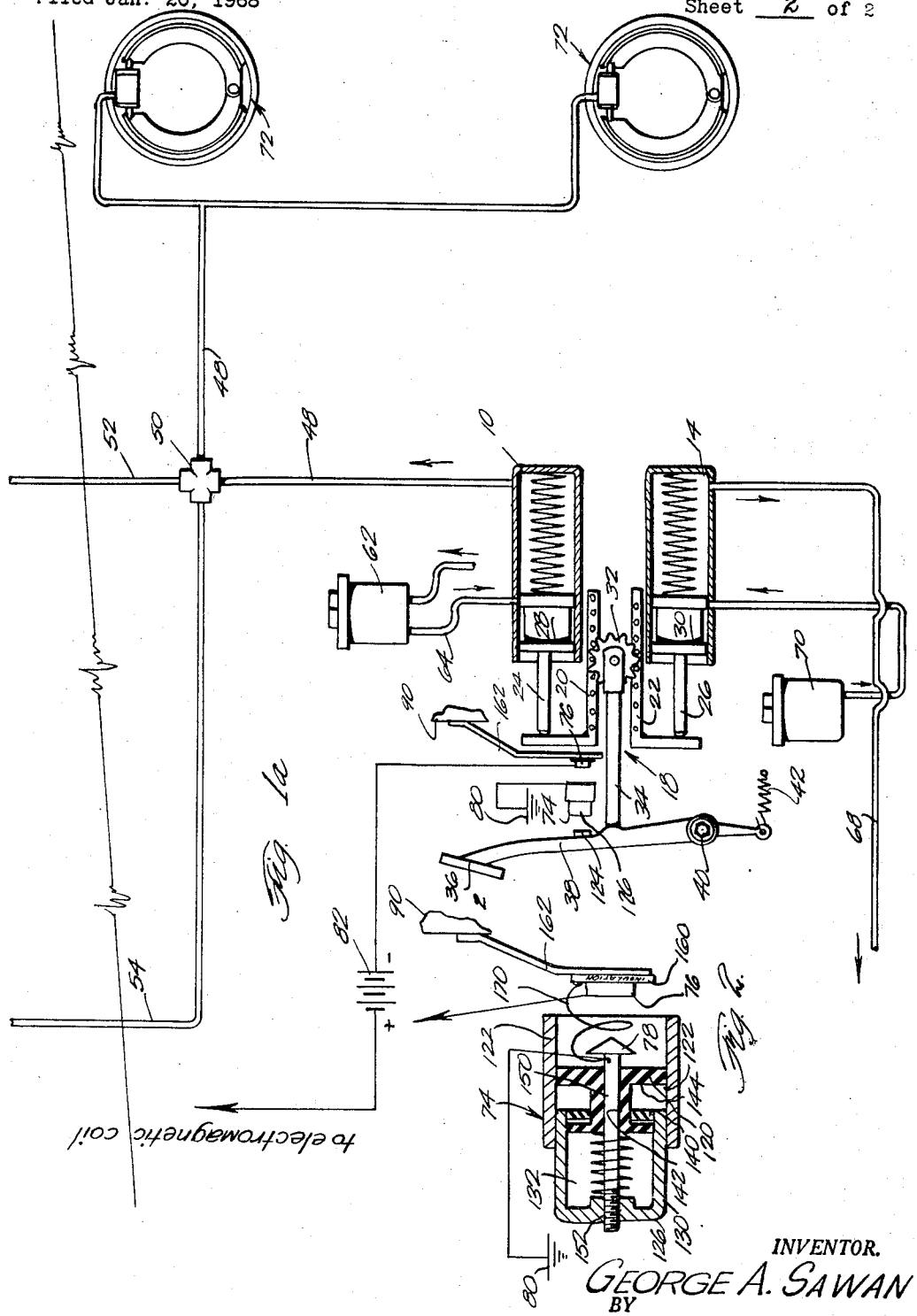

3,432,211
SAFETY AUTOMATIC BRAKE
George A. Sawan, Chtoura, Talabaya, Lebanon
Filed Jan. 26, 1968, Ser. No. 700,790
Claims priority, application Lebanon, Mar. 7, 1967,
2,360
U.S. Cl. 303—18    10 Claims
Int. Cl. B60t 7/16, 8/10

ABSTRACT OF THE DISCLOSURE

Automatic brake means in which the hydraulic brake pump for the front and rear brakes of an automobile are driven by equalizer actuating means driven from a brake pedal, an impact or thrust responsive electric switch actuable on panic depression of said brake pedal such as during skid conditions of the automobile, a relay solenoid mounted on a clamp frame for actuation by the impact responsive electric switch for clamping the clamp frame to a clamp shaft, the clamp shaft being connected for axial movement to the steering rod, corrective equalizer or differential mechanism responsive to displacement of said clamp shaft, so that when the steering rod is moved and the clamp frame is retained to follow the clamp shaft by energization of said relay solenoid, a slide valve is opened for bleeding hydraulic fluid from the front brake lines back to the fluid reservoir of said brake system.

---

The present invention relates to automatic brake control means for protection and control against serious accident of cars while in skid conditions, and more particularly the invention relates to brake control means for allowing the front wheels of the automobile to be released from control of their front brakes so that the front wheels may rotate after the steering wheel is turned in either direction subsequent to impact or thrust depression of the brake pedal.

In the present invention apparatus is provided for sensing impact or thrust depression of the brake pedal, which actuates a thrust or impact responsive electric switch for actuating a relay solenoid for clamping a clamp frame onto a clamp shaft, so that upon turning of a steering wheel relative to the position in which the steering wheel was positioned at the time of the depression of the brake pedal, that then a butterfly valve actuable by said clamp shaft causes bleeding of the brake line to the front wheel brake and thereby realizes renewed rotation of the front wheels of the automobile, and therefore correct or again obtain control of the skidding vehicle.

It is quite evident that a car would not take a turn either to the right or to the left unless its front or directing wheels are turning. In a strong, sudden, or impact application of the brakes, and in face of immediate danger, upon impact depression of the brake pedal, the four wheels are braked, resulting in the wheels being locked in position. Under skid conditions, the car however continues to slide along in its flinging manner for a distance proportional or responsive to its forward speed, and in accordance with the prior art devices, any maneuvering of the steering wheel either to the right or to the left is unable to change and bring under control the skidding vehicle. In such circumstances, there being insufficient distance for free skidding, accidents are seen to take place.

It is an object and advantage of the present invention that hydraulic brakes of the present art may be used properly by the automatic brake means of the present invention so that the rear brake continues to lock the rear wheels while those wheels at the front of the vehicle are controlled by a separate brake arrangement under separate pump control means and by differential or equalizing means together with impact or panic responsive means, the turning of the steering wheel may be used to release braking of the front wheels and return hydraulic fluid to the fluid reservoir.

Further objects and advantages of the present invention will be apparent from the following description, reference being had to the accompanying drawings wherein preferred embodiments of the present invention are clearly shown, and in which:

FIGURE 1A shows the remainder portion of the automatic brake means of the present invention associated with FIGURE 1 and in which there is shown the brake pedal and thrust or impact responsive electric switch and differential pump arrangement for the front and rear brake systems, in accordance with the preferred embodiment of the present invention.

FIGURE 2 shows, on an enlarged scale, details of the impact or thrust responsive electric switch referred to in FIGURE 1A.

Figure 1:
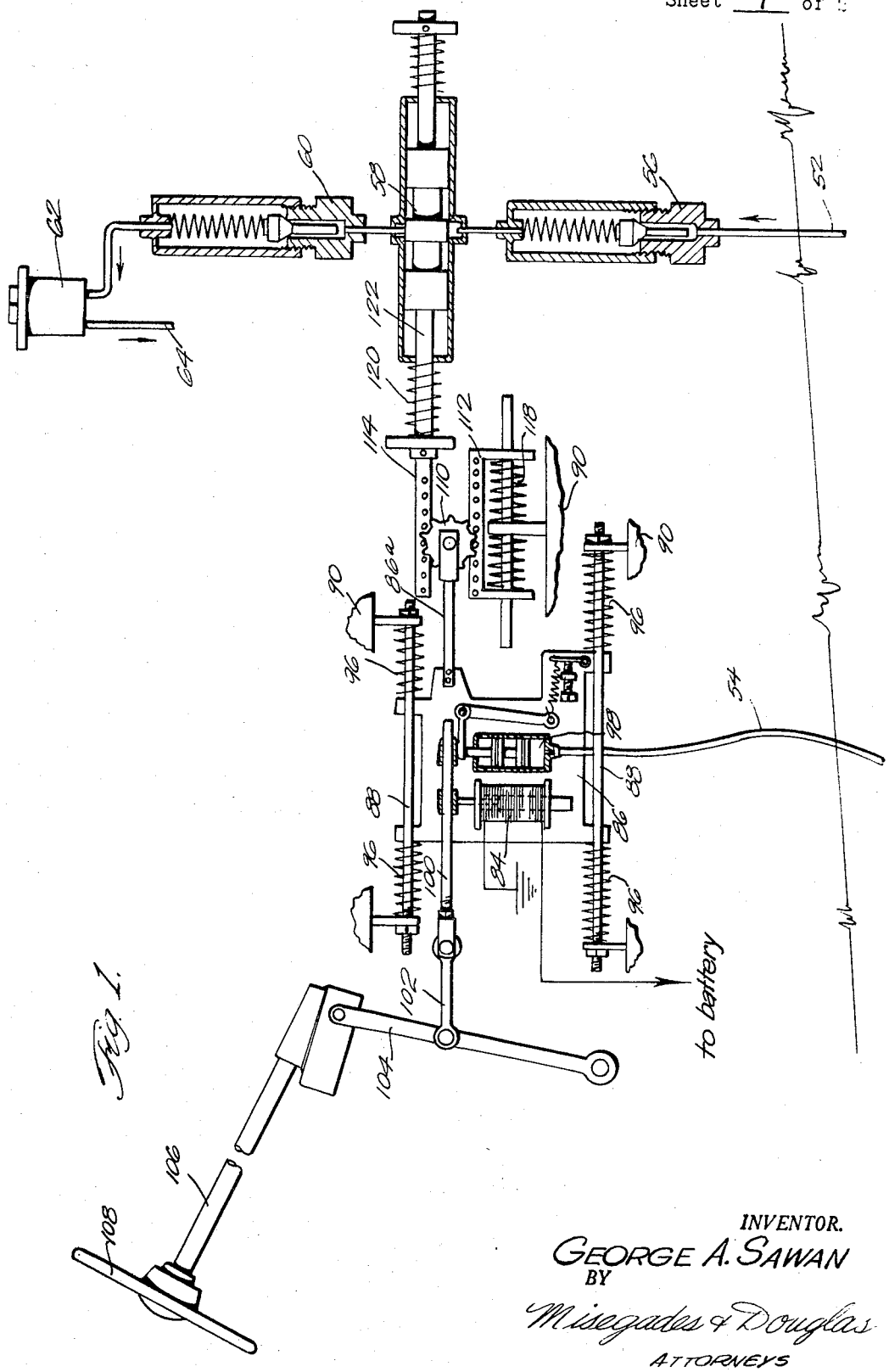
FIGURE 1 is a diagram, partially in cross-section, of the steering wheel actuable clamping means and slide valve in the bleed line for the front brake system, in accordance with a portion of the preferred embodiment of the present invention.

Referring now to the drawings there is shown the automatic brake means including a hydraulic brake pump 10 for the front wheel brake system 12 and a rear wheel brake pump 14 for an automobile, and in which there is further provided an equalizer or differentiating drive means 18 for the hydraulic pumps 10, 14. The equalizer 18 includes an equalizer rack 20, 22 connected to each of the piston rods 24, 26, respectively, of the pistons 28, 30 of the hydraulic pumps 10, 14, and in which the equalizer racks 20, 22 are interconnected mechanically by an engaging pinion 32.

The pinion 32 is seen driven by a brake bar or brake rod 34 which in turn is driven by a brake pedal 36 mounted on a brake pedal rod 38 pivotally mounted by pivot means 40, and in which there is provided spring biasing means 42 for positioning the brake pedal rod 38 in its upstanding position.

The pumps 10, 14 are hydraulically connected to brake actuating means, and more particularly hydraulic pump 10 is connected to brake means 12 through hydraulic lines 48, which lines are also connected by a joint 50 to lines 52 to a high pressure return valve 56, a slide valve 58, a low pressure return valve 60 to a reservoir hydraulic tank 62, and in which a return line 64 is returned and connected to the brake pump 10, as shown in FIGURE 1A.

Brake pump 14 is connected by line 68 to the rear brake means, and the reservoir tank 70 is shown connected to the brake pump 14.

There is disposed and positioned on the action side of the brake pedal rod 38 a thrust or impact responsive electric switch 74 which includes a pair of contacts 76, 78 which, when closed, complete an electrical circuit from ground 80 through a 12 or 6 volt battery 82 to a relay solenoid 84 mounted on a clamp frame 86 which is supportably mounted on a pair of bars 88, 88. The bars 88 are parallel and are mounted from the car chassis 90 shown partially, and it is also illustrated, such as is shown in FIGURE 2, that the contact 76 is also mounted from the chassis 90.

The clamp frame 86 is spring biased on the bars 88, 88 by springs 96, 96 to a central position on said bars, and the clamp frame 86 has also mounted thereon a hydraulic pump 98 hydraulically connected by line 54 to the junction 50.

When the solenoid 84 is energized, the armature engages and locks upon a clamp shaft 100 which is pivotally connected by lever 102 to a steering rod 104 which is connected at one end to the steering mechanism (not shown) and at the other end to the steering shaft 106 and steering wheel 108.

The other end of the clamp shaft 100 is connected to a pinion 110 which engages a corrective and equalizing rack pair 112, 114, in which the rack 112 is relatively fixed with respect to the chassis 90 through a spring biasing arrangement 118 which is stronger than the spring biasing means 120 connected to the rod 122 associated with rack 114. The rod 122 is connectably coupled to the slide valve 58, and upon turning of the steering wheel 108, which associatively operates axial displacement of the clamp shaft 100, and upon simultaneous energization of the relay solenoid 84, the clamp frame 86 connected to the clamp frame shaft 86a provides movement of the pinion 110 and the rack 114 so that the slide valve 58 is displaced for releasing hydraulic fluid through the high pressure return valve 56, the low pressure return valve 60 into the reservoir 62.

The hydraulic clamp pump 98 provides for clamping the piston shaft of the pump 98 to the clamp shaft 100 at the end of the stroke of the brake pedal rod 38 under emergency and desired conditions.

In FIGURE 2, there is shown the manner in which the impact or thrust responsive inertia electric switch 74 operates, and in which the contact 78 is connected to a piston means 120 in a cylinder 122, and upon depression of the brake pedal rod 38, portion 124 on the brake pedal rod engages surface 126 of the impact switch; and if there is substantial thrust or impact applied to the brake pedal rod 38, the brake pedal rod will contact physically with a casing 130 to provide a foot sensing indication to the operator's foot and the operator is aware that all the wheels are still rotating. The operator then knows that if he is to lock or brake the wheels, he is to apply continued thrust or impact to the brake pedal rod 38 to extend the casing 130 along inner cylinder walls 122, and simultaneously contact is established and remains established between contact 76, 78. FIGURE 2 shows the position of the casing 130 in the cylinder 122 on initial contact of the brake pedal rod portion 124 with the surface 126. The impact on casing 130 moves a flanged portion 140 of the casing 130 along the distance of piston sleeve 142 from flanged portion 140 to a piston element 144 on the piston means 120. On contact of the portion 140 on the piston element 144, the piston means then is moved in the direction toward the contact 76, and while contact 78 has progressed in movement continuously from the time of impact of the portion 124 on the casing surface 126. It is seen that the contact 78 is mounted on an end of axial rod 150 having its other end threadedly secured to an axial opening 152 of the casing 130. When the four wheels are locked, the contacts become closed.

The contact 76 is mounted on an insulation base 160 which in turn is mounted on a leaf spring base 162 secured on the chassis 90, described above.

The effect of the leaf spring base is to take up any remaining displacement of the movement of shaft 150 after the contacts 76, 78 are closed.

Return bias means may be provided, such as spring 170, to return the casing 130 to a normally open position for contacts 76, 78.

Upon substantial thrust or impact being applied to the brake pedal rod, contacts 76, 78 are closed and the electric circuit is energized for actuation of the solenoid 84.

The objects and advantages of the present invention are realized in practicing the construction of the preferred embodiment above described. While the embodiments of the present invention as herein disclosed constitute preferred forms of the invention, it is to be understood that other forms might be constructed and various particulars and details may be used.

What is claimed is:

1. An automatic brake means comprising a hydraulic brake pump including piston and cylinder for front and rear brakes of an automobile, an equalizer rack connected to each piston of said front and rear brake pump, an equalizer connecting pinion engaging each rack, a brake rod mounting the pinion, a brake pedal for depressing said brake rod, an impact or thrust responsive electric switch actuable on panic depression of said brake pedal such as during skid conditions, a relay solenoid actuated on closure of said electric switch, said relay solenoid mounted on a clamp frame, a clamp shaft, said clamp frame being slidably mounted on a pair of fixed bars, said relay solenoid when energized clamping said clamp frame fixedly to said clamp shaft, said clamp shaft being connected for axial movement thereof to a steering rod, a correction rack pair and pinion arrangement driven by said clamp shaft when clamped to said clamp frame, a valve in the hydraulic brake line for said front brakes to release fluid from said brake line to return fluid to a reservoir and release thereby front wheels for rotation for regaining control of said automobile upon turning of said steering rod.

2. The invention of claim 1 wherein a clamping hydraulic pump having a piston and cylinder is mounted on said clamp frame, the piston thereof driving a rod, a spring biased lever restraining movement of said piston rod, said piston rod upon overcoming the biased lever then clamping said clamp shaft, said clamping hydraulic pump being overridden by said impact responsive relay solenoid when energized.

3. The invention of claim 2 wherein the brake line to the valve includes return valves.

4. The invention of claim 1 wherein said electric switch includes a movable contact mounted at the end of an axially displaceable rod, a casing axially secured to said rod at its other end, the periphery of said casing engaging inner walls of a cylinder, a piston disposed also within said cylinder, and said casing having a spring to bias away said casing from said piston.

5. The invention of claim 1 wherein said valve comprises a chamber having an inlet port and an outlet port in alignment to each other, a valve piston mounted on a shaft which is responsively axially displaced right and left by movement of said correction rack pair and pinion arrangement.

6. The invention of claim 1 wherein said correction rack pair and pinion arrangement comprises said pinion intermeshing said racks, one rack engaged to said valve, and the other rack centrally biased about a reference point by a pair of opposing springs.

7. The invention of claim 1 wherein said equalizer rack and pinion comprise a differential mechanism in which each rack is connected to respective ones of said front brake piston and said rear brake piston in their respective cylinders.

8. The invention of claim 1 wherein clamp frame is centrally biased to a reference position by opposing spring means.

9. The invention of claim 1 wherein the brake line to the valve includes a high pressure return valve on an in-port side of the valve and a low pressure return valve on an out-port side of the valve.

10. The invention of claim 1 wherein said brake pedal rod includes a surface contact member to engage a casing of said electric switch.

References Cited

UNITED STATES PATENTS 2,748,881   6/1956   Holley.

FERGUS S. MIDDLETON, *Primary Examiner.*

J. J. McLAUGHLIN, JR., *Assistant Examiner.*

U.S. Cl. X.R.

180—82; 303—21